US012577432B2

(12) United States Patent
Yasuda et al.

(10) Patent No.: US 12,577,432 B2
(45) Date of Patent: Mar. 17, 2026

(54) ORGANOSILICON COMPOUND, PRODUCTION METHOD THEREFOR, AND CURABLE COMPOSITION

(71) Applicant: SHIN-ETSU CHEMICAL CO., LTD., Tokyo (JP)

(72) Inventors: Shigeki Yasuda, Annaka (JP); Minoru Urata, Suita (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 348 days.

(21) Appl. No.: 18/271,155

(22) PCT Filed: Dec. 15, 2021

(86) PCT No.: PCT/JP2021/046192

§ 371 (c)(1),
(2) Date: Jul. 6, 2023

(87) PCT Pub. No.: WO2022/158176

PCT Pub. Date: Jul. 28, 2022

(65) Prior Publication Data

US 2024/0059929 A1 Feb. 22, 2024

(30) Foreign Application Priority Data

Jan. 20, 2021 (JP) ................................ 2021-006795

(51) Int. Cl.

| | |
|---|---|
| ***C09J 4/00*** | (2006.01) |
| ***C07F 7/18*** | (2006.01) |
| ***C09D 4/00*** | (2006.01) |

(52) U.S. Cl.

CPC ............... *C09J 4/00* (2013.01); *C07F 7/1892* (2013.01); *C09D 4/00* (2013.01)

(58) Field of Classification Search

None

See application file for complete search history.

(56) References Cited

U.S. PATENT DOCUMENTS

| | | | |
|---|---|---|---|
| 6,815,554 B2 | 11/2004 | Pfeiffer et al. | |
| 2002/0115878 A1 | 8/2002 | Wakita et al. | |
| 2012/0016095 A1 | 1/2012 | Saito et al. | |
| 2021/0155800 A1 | 5/2021 | Yamada et al. | |
| 2021/0163512 A1 | 6/2021 | Yamada et al. | |
| 2022/0127491 A1 * | 4/2022 | Conley ................ | C09D 165/00 |

FOREIGN PATENT DOCUMENTS

| | | | |
|---|---|---|---|
| EP | 1 234 830 | A2 | 8/2002 |
| GB | 975122 | A | 11/1964 |
| JP | 2011-74068 | A | 4/2011 |
| JP | 2011-137123 | A | 7/2011 |
| JP | 2018-154720 | A | 10/2018 |
| JP | 2019-182815 | A | 10/2019 |
| JP | 2019-183082 | A | 10/2019 |

OTHER PUBLICATIONS

International Search Report, issued in PCT/JP2021/046192, PCT/ISA/210, dated Mar. 1, 2022.

Written Opinion of the International Searching Authority, issued in PCT/JP2021/046192, PCT/ISA/237, dated Mar. 1, 2022.

Chinese Office Action and Search Report for Chinese Application No. 202180091196.8, dated May 20, 2025, with English translation.

Extended European Search Report for European Application No. 21921278.4, dated Dec. 16, 2024.

* cited by examiner

*Primary Examiner* — Samir Shah

(74) *Attorney, Agent, or Firm* — Birch, Stewart, Kolasch & Birch, LLP

(57) ABSTRACT

An organosilicon compound represented by formula (1).

(1)

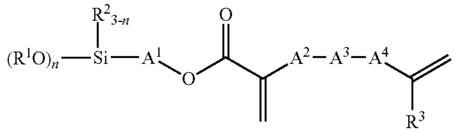

($R^1$ is an alkyl, alkenyl, aryl, or acyl group, $R^2$ is an alkyl or aryl group, $R^3$ is a hydrogen atom or a methyl group, $A^1$ is a single bond or an alkylene group, $A^2$, $A^3$, and $A^4$ are each a methylene group or an oxygen atom, with the proviso that at least one of the $A^2$, $A^3$, and $A^4$ moieties is an oxygen atom, and n is an integer of 1-3.)

10 Claims, No Drawings

ORGANOSILICON COMPOUND, PRODUCTION METHOD THEREFOR, AND CURABLE COMPOSITION

TECHNICAL FIELD

The present invention relates to an organosilicon compound, a method for preparing the same, and a curable composition. More specifically, the invention relates to an organosilicon compound having on the molecule a hydrolyzable silyl group and a polymerizable group, a method for preparing the compound, a curable composition containing the compound, and an article having a coating layer composed of the composition in cured form.

BACKGROUND ART

Silane coupling agents, which are compounds having on the molecule both a moiety with reactivity to inorganic matter (a silicon atom-bonded hydrolyzable group) and a moiety capable of imparting various functions such as reactivity to organic matter, solubility and radical polymerizability, are widely used as adhesive modifiers at interfaces between inorganic matter and organic matter and, because they act as resin modifiers on inorganic-organic composite materials, as composite resin modifiers.

Of these, silane coupling agents having a polymerizable group may be used as resin modifiers for (meth)acrylic resins and as adhesive modifiers for (meth)acrylic polymer-based pressure-sensitive adhesives.

However, a drawback of primer compositions which use a conventional polymerizing group-containing silane coupling agent and adhesive compositions which include a polymerizable group-containing silane coupling agent is that they lack sufficient adherence to various substrates.

Compounds with an allyl ether moiety and an acryloyl group on the same molecule have been reported as polymerizable compounds that are capable of forming compositions which give a cured product having excellent adherence to various substrates (Patent Documents 1 and 2). These compounds undergo cyclic polymerization via a radical polymerization mechanism. The curing properties and properties after curing of compositions containing these compounds are superior to those of compositions containing conventional polymerizable compounds.

As for silane coupling agents having a polymerizable group, although compounds with an acryloyl group or a methacryloyl structure in which the α-substituent is a methyl group are known, there are few examples of silane coupling agents with different α-substituents. In particular, there are no reported examples of silane coupling agents which, as mentioned above, have on the same molecule both an alkenyl ether moiety and an acryloyl group and exhibit cyclic polymerizability.

PRIOR ART DOCUMENTS

Patent Documents

Patent Document 1: JP-A 2011-074068
Patent Document 2: JP-A 2011-137123

SUMMARY OF INVENTION

Technical Problem

In light of the above circumstances, the objects of the present invention are to provide an organosilicon compound which, when added to a curable composition, gives a cured product having excellent adherence to substrates, a method for preparing the compound, and a curable composition, coating agent, adhesive and cured article which contain the compound.

Solution to Problem

The inventors have conducted intensive investigations in order to achieve the above objects. As a result, they have discovered an organosilicon compound having a hydrolyzable silyl group, an alkenyl ether moiety and an acryloyl group on the molecule, and a method for preparing the compound. They have also found that curable compositions containing this organosilicon compound give cured products having an excellent adherence to substrates and are therefore suitable as coating agents and adhesives.

Accordingly, the invention provides the following organosilicon compound, method for preparing the same, curable composition, coating agent, adhesive and article.

[1]

An organosilicon compound of formula (1) below

[Chem. 1]

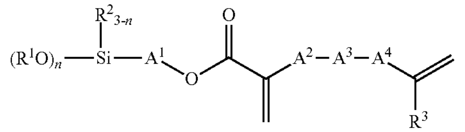

(1)

(wherein each $R^1$ is independently an alkyl group of 1 to 10 carbon atoms, an alkenyl group of 2 to 10 carbon atoms, an aryl group of 6 to 10 carbon atoms or an acyl group of 1 to 20 carbon atoms;

each $R^2$ is independently an alkyl group of 1 to 10 carbon atoms or an aryl group of 6 to 10 carbon atoms;

$R^3$ is a hydrogen atom or a methyl group;

$A^1$ is a single bond or a substituted or unsubstituted divalent hydrocarbon group of 1 to 20 carbon atoms;

$A^2$, $A^3$ and $A^4$ are each independently a substituted or unsubstituted methylene group or oxygen atom, with the proviso that one or more of $A^2$, $A^3$ and $A^4$ is an oxygen atom and no oxygen atoms are mutually adjoining; and n is an integer from 1 to 3).

[2]

The organosilicon compound of [1], wherein $A^1$ is an alkylene group of 1 to 10 carbon atoms.

[3]

The organosilicon compound of [1] or [2], wherein $A^2$ and $A^4$ are methylene groups, and $A^3$ is an oxygen atom.

[4]

A method for preparing the organosilicon compound of any of [1] to [3] which includes the step of reacting a halogen group-containing organosilicon compound of formula (3) below with a metal salt compound of formula (4) below.

[Chem. 2]

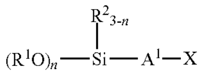

(3)

-continued (4)

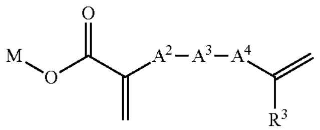

(wherein $R^1$, $R^2$, $R^3$, $A^1$, $A^2$, $A^3$, $A^4$ and n are as defined above; X is a chlorine, bromine or iodine atom; and M is an alkali metal).

[5]

A curable composition which includes the organosilicon compound of any of [1] to [3].

[6]

A coating agent which includes the curable composition of [5].

[7]

An adhesive which includes the curable composition of [5].

[8]

A cured product obtained by curing the curable composition of [5].

[9]

An article having a coating layer obtained by curing the coating agent of [6].

[10]

An article having a bonding layer obtained by curing the adhesive of [7].

Advantageous Effects of Invention

This invention provides an organosilicon compound having on the molecule a hydrolyzable silyl group, an alkenyl ether moiety and an acryloyl group. Curable compositions containing this organosilicon compound have an excellent adherence to various substrates, and so can be suitably used in a variety of applications, such as coating agents and adhesives.

DESCRIPTION OF EMBODIMENTS

The invention is described in detail below. In this invention, "silane coupling agents" are encompassed by "organosilicon compounds."

[Organosilicon Compound]

The organosilicon compound of the invention is represented by formula (1) below.

[Chem. 3]

(1)

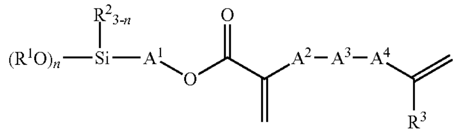

Each $R^1$ is independently an alkyl group of 1 to 10 carbon atoms, an alkenyl group of 2 to 10 carbon atoms, an aryl group of 6 to 10 carbon atoms or an acyl group of 1 to 20 carbon atoms.

Specific examples include linear, branched or cyclic alkyl groups such as methyl, ethyl, n-propyl, isopropyl, n-butyl, isobutyl, tert-butyl, n-pentyl, neopentyl, n-hexyl, n-octyl and cyclohexyl groups; alkenyl groups such as vinyl, allyl and propenyl groups; aryl groups such as phenyl, tolyl, xylyl and naphthyl groups; and acyl groups such as formyl, acetyl, and propionyl groups. Of these, alkyl groups of 1 to 8 carbon atoms are preferred, alkyl groups of 1 to 6 carbon atoms are more preferred, and methyl and ethyl groups are even more preferred.

Each $R^2$ is independently an alkyl group of 1 to 10 carbon atoms or an aryl group of 6 to 10 carbon atoms.

Specific examples include linear, branched or cyclic alkyl groups such as methyl, ethyl, n-propyl, isopropyl, n-butyl, isobutyl, tert-butyl, n-pentyl, neopentyl, n-hexyl, n-octyl and cyclohexyl groups; and aryl groups such as phenyl, tolyl, xylyl and naphthyl groups. Of these, alkyl groups of 1 to 8, especially 1 to 6, carbon atoms and the phenyl group are preferred; methyl, ethyl and phenyl groups are even more preferred.

$R^{13}$ is a hydrogen atom or a methyl group.

$A^1$ is a single bond or a substituted or unsubstituted divalent hydrocarbon group of 1 to 20 carbon atoms. The divalent hydrocarbon group of $A^1$ may be linear, branched or cyclic. Specific examples include alkylene groups of 1 to 20, preferably 1 to 6, carbon atoms, cycloalkylene groups of 3 to 20 carbon atoms, alkenylene groups of 2 to 10 carbon atoms, arylene groups of 6 to 10 carbon atoms, and aralkylene groups of 7 to 10 carbon atoms. Specific examples include alkylene groups such as methylene, ethylene, propylene, trimethylene, tetramethylene, pentamethylene, hexamethylene, heptamethylene and octamethylene groups; cycloalkylene groups such as the cyclohexylene group; alkenylene groups such as vinylene and propenylene groups; arylene groups such as phenylene, tolylene, xylylene and naphthylene groups; and aralkylene groups such as benzylene, phenylethylene and phenylpropylene groups.

$A^2$, $A^3$ and $A^4$ are each independently a substituted or unsubstituted methylene group or an oxygen atom, with the proviso that one or more of $A^2$, $A^3$ and $A^4$ is an oxygen atom and no oxygen atoms are mutually adjoining. Examples of substituted methylene groups include methylmethylene and dimethylmethylene groups.

The letter 'n' is an integer from 1 to 3.

The organosilicon compound of the invention is preferably a compound of formula (2) below:

[Chem. 4]

(2)

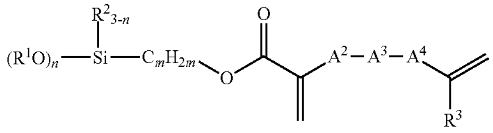

(wherein $R^1$, $R^2$, $R^3$, $A^2$, $A^3$, $A^4$ and n are as defined above, and in is an integer from 1 to 10).

Of $A^2$, $A^3$ and $A^4$, $A^2$ and $A^4$ are preferably methylene groups and $A^3$ is preferably an oxygen atom.

The letter 'm' is an integer from 1 to 10, preferably an integer from 2 to 10, and more preferably an integer from 2 to 6.

Accordingly, the organosilicon compound of the invention is more preferably a compound of formula (5) below.

[Chem. 5]

(5)

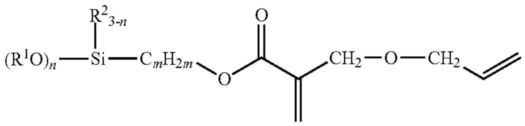

(wherein $R^1$, $R^2$, m and n are as defined above).

Specific examples of such organosilicon compounds include those of formulas (6) to (9) below:

[Chem. 6]

(6)

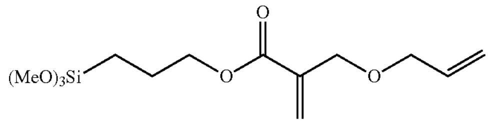

(7)

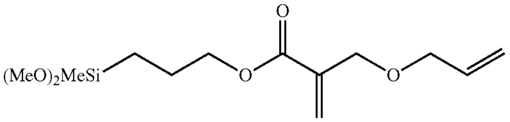

(8)

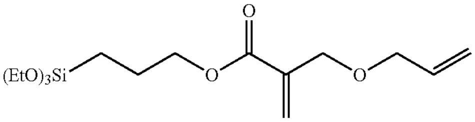

(9)

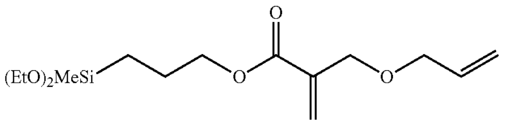

(wherein Me represents a methyl group and Et represents an ethyl group).

The organosilicon compound of the invention has a kinematic viscosity which, although not particularly limited, is preferably from 0.1 to 1,000 $mm^2/s$, more preferably from 0.5 to 100 $mm^2/s$, and even more preferably from 1 to 10 $mm^2/s$. The kinematic viscosity is a value measured based on JIS Z 8803.

The organosilicon compound of the invention can be obtained by, for example, reacting a halogen group-containing organosilicon compound of formula (3) below with a metal salt compound of formula (4) below:

[Chem. 7]

(3)

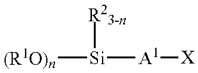

-continued (4)

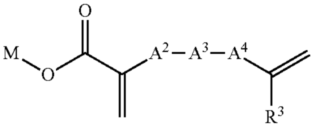

(wherein $R^1$, $R^2$, $R^3$, $A^1$, $A^2$, $A^3$, $A^4$ and n are as defined above; X is a chlorine, bromine or iodine atom; and M is an alkali metal).

Examples of the alkali metal represented by M include sodium and potassium.

Specific examples of the halogen group-containing organosilicon compound of formula (3) include 3-chloropropyltrimethoxysilane, 3-chloropropylmethyldimethoxysilane, 3-chloropropyldimethylmethoxysilane, 3-chloropropyltriethoxysilane, 3-chloropropylmethyldiethoxysilane and 3-chloropropyldimethylethoxysilane.

Specific examples of the metal salt compound of formula (4) include sodium 2-(allyloxymethyl)acrylate and potassium 2-(allyloxymethyl)acrylate.

The halogen group-containing organosilicon compound of formula (3) and the metal salt compound of formula (4) are preferably reacted in proportions which, expressed as the molar ratio of the halogen group-containing organosilicon compound to the metal salt compound, is from 1.0:0.3 to 1.0:3.0, and especially from 1:0.8 to 1:1.2.

When preparing the organosilicon compound of the invention, it is desirable to add a polymerization inhibitor, and more desirable to have a molecular oxygen-containing gas be present together with the polymerization inhibitor. Air or oxygen gas diluted with an inert gas such as nitrogen is normally used as the molecular oxygen-containing gas and is blown into the handling equipment.

A polymerization inhibitor for radical-polymerizable monomers may be used as the polymerization inhibitor. Examples include phenolic inhibitors such as hydroquinone, methyl hydroquinone, trimethyl hydroquinone, t-butyl hydroquinone, p-methoxyphenol, 2,6-di-t-butyl-p-cresol, 6-t-butyl-2,4-xylenol, 2,6-di-t-butylphenol, 2,6-di-t-butyl-4-methoxyphenol and 2,2'-methylenebis(4-methyl-6-t-butylphenol); copper salts of organic acids; and phenothiazine. Of these, phenolic inhibitors are desirable in terms of their low coloration and their ability to inhibit polymerization, and p-methoxyphenol, 2,6-di-t-butyl-p-cresol, 6-t-butyl-2,4-xylenol and 2,6-di-t-butylphenol are desirable from the standpoint of availability and economic considerations.

One of these polymerization inhibitors may be used alone or two or more may be used in combination.

The amount of polymerization inhibitor added, although not particularly limited, is typically from about 100 ppm to about 100,000 ppm, based on the weight of the metal salt compound of formula (4).

When preparing the organosilicon compound of the invention, a catalyst such as a phase transfer catalyst may be optionally used. Exemplary phase transfer catalysts include quaternary phosphonium salts and quaternary ammonium salts.

Examples of quaternary phosphonium salts include tetraethylphosphonium chloride, tetraethylphosphonium bromide, tetraethylphosphonium iodide, tetrabutylphosphonium bromide, triphenylbenzylphosphonium bromide and tetraphenylphosphonium bromide.

Examples of quaternary ammonium salts include tetramethylammonium hydroxide, tetraethylammonium hydroxide, trimethylbenzylammonium hydroxide, tetramethylammonium bromide, tetraethylammonium bromide, tetrabutylammonium bromide, trimethylbenzylammonium bromide, triethylbenzylammonium bromide, trimethylphenylammonium bromide, triethylbenzylammonium chloride, tetramethylammonium chloride, trioctylmethylammonium chloride, tributylbenzylammonium chloride, trimethylbenzylammonium chloride, N-laurylpyridinium chloride, N-benzylpicolinium chloride, N-lauryl-4-picolinium chloride, N-laurylpicolinium chloride, tricaprylmethylammonium chloride, tetramethylammonium iodide, tetra-n-butylammonium iodide and tetrabutylammonium hydrogen sulfate.

In cases where a catalyst is used, the amount thereof is not particularly limited. However, from the standpoint of reactivity and productivity, the amount of catalyst used with respect to the halogen group-containing organosilicon compound of formula (3) is preferably from 0.1 to 10.0% by weight, more preferably from 1.0 to 5.0% by weight, and even more preferably from 2.0 to 4.0% by weight.

When preparing the organosilicon compound of the invention, a solvent may be optionally used. The solvent is not particularly limited, so long as it is non-reactive with the halogen group-containing organosilicon compound and the metal salt compound serving as the starting materials.

Specific examples include aliphatic hydrocarbon solvents such as pentane, hexane, heptane and decane, ether solvents such as diethyl ether and tetrahydrofuran; and aromatic hydrocarbon solvents such as benzene, toluene and xylene. One of these solvents may be used alone or two or more may be used in admixture.

The reaction is not particularly limited as to the reaction temperature, and may be carried out at from 0° C. or under heating; a temperature of between 0° C. and 200° C. is preferred. To obtain a suitable reaction rate, it is preferable to carry out the reaction under heating. From this standpoint, the reaction temperature is more preferably between 40° C. and 110° C., and still more preferably between 40° C. and 90° C.

The reaction time also is not particularly limited, and is normally from about 1 hour to about 30 hours, preferably from 1 to 20 hours, and more preferably from 1 to 10 hours.

The alkali metal halide that forms when preparing the organosilicon compound of the invention can be separated from the target organosilicon compound by a known method such as filtration. The organosilicon compound of the invention can be further purified by a known method such as vacuum distillation or liquid column chromatography.

[Curable Composition]

The curable composition of the invention includes the organosilicon compound of above formula (1).

By adding the organosilicon compound of the invention to the curable composition, the adherence of the cured product obtained by curing the composition to various substrates can be increased, thus making the curable composition of the invention useful as coating agent compositions and adhesive compositions.

The inventive organosilicon compound-containing curable composition, coating agent composition and adhesive composition (sometimes referred collectively below as "the composition") have a content of the above organosilicon compound which, although not particularly limited, is preferably from about 0.1% by weight to about 50% by weight, and more preferably from 0.5 to 30% by weight, of the composition. When a solvent is included in the composition, the content of the organosilicon compound refers to the nonvolatile content, excluding the solvent.

The composition of the invention preferably includes an organic resin as the base resin.

The organic resin is not particularly limited. Specific examples include epoxy resins, phenolic resins, polycarbonates and polycarbonate blends, acrylic resins, polyester resins, polyamide resins, polyimide resins, polyurethane resins, polybutadiene resins, styrene-butadiene copolymer resins, acrylonitrile-styrene copolymer resins, styrene-acrylonitrile-butadiene copolymer resins, polyvinyl chloride resins, polystyrene resins, polyphenylene ether resins, polymerizable reactive group-containing polyphenylene ether resins, blends of polystyrene and polyphenylene, and cellulose acetate butyrate resins.

A curing agent suitable for the organic resin used may be included in the composition. For example, when an epoxy resin is used, a curing agent such as an imidazole compound may be included. When a polymerizable reactive group-containing polyphenylene ether resin is used, a curing agent such as a peroxide may be included.

In addition, it is preferable to include a curing catalyst in order to accelerate the reaction in which the hydrolyzable group on the organosilicon compound is hydrolytically condensed by moisture in air and thereby promote curing of the composition.

The curing catalyst is not particularly limited, so long as it is a curing catalyst which can be used to cure ordinary moisture/condensation cure compositions. Specific examples include alkyltin compounds such as dibutyltin oxide and dioctyltin oxide; alkyltin ester compounds such as dibutyltin diacetate, dibutyltin dilaurate, dioctyltin dilaurate, dibutyltin dioctoate, dioctyltin dioctoate and dioctyltin diversate; titanate esters such as tetraisopropoxytitanium, tetra-n-butoxytitanium, tetra-t-butoxytitanium, tetrakis(2-ethylhexoxy)titanium, dipropoxybis(acetylacetonato)titanium, titanium diisopropoxybis(ethyl acetoacetate) and titanium isopropoxyoctylene glycol, and also titanium chelate compounds and partial hydrolyzates thereof; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, aluminum trihydroxide, aluminum alcoholates, aluminum acylates, salts of aluminum acylates, aluminosiloxy compounds and aluminum chelate compounds, aminoalkyl group-substituted alkoxysilanes such as 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine and N-phenyl-3-aminopropyltrimethoxysilane; amine compounds and salts thereof such as hexylamine, dodecylamine phosphate and tetramethylguanidine; quaternary ammonium salts such as benzyltriethylammonium acetate; lower fatty acid salts of alkali metals such as potassium acetate, sodium acetate and lithium oxalate; dialkylhydroxylamines such as dimethylhydroxylamine and diethylhydroxylamine; guanidyl group-containing silanes and siloxanes such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane and tetramethylguanidylpropyltris(trimethylsiloxy)silane; and phosphazene base-containing silanes and siloxanes such as N,N,N',N',N'',N''- hexamethyl-N'''-[3-(trimethoxysilyl)propyl]phosphorimidic triamide. These may be used singly or two or more may be used in combination.

The amount of curing catalyst added is not particularly limited. However, to adjust the cure rate within a suitable range and enhance the ease of use, the amount of addition per 100 parts by weight of the base resin is preferably from 0.01 to 15 parts by weight, and more preferably from 0.1 to 5 parts by weight.

A composition containing the organosilicon compound of the invention and a resin, especially a radical polymerizable group-containing resin, can be cured by initiating radical polymerization via heating and/or exposure to electromagnetic wave, electron beam or other radiation, although curing can be more effectively achieved with the concomitant use of a radical initiator.

Radical initiators include thermal radical initiators which generate a radical via heating, and photoradical initiators which generate a radical via exposure to radiation. One commonly used radical initiator may be used alone or two or more may be used in combination. Where necessary, a commonly used radical polymerization promoter, photosensitizer or the like may be added alone, or two or more may be added in combination.

The thermal radical initiator is preferably an organic peroxide-type initiator or an azo-type initiator. Specific examples are given below.

Examples of organic peroxide-type initiators include methyl ethyl ketone peroxide, cyclohexanone peroxide, methyl cyclohexanone peroxide, methyl acetoacetate peroxide, acetyl acetate peroxide, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)-2-methylcyclohexane, 1,1-bis(t-butylperoxy)cyclohexane, 1,1-bis(t-butylperoxy)cyclododecane, 1,1-bis(t-butylperoxy)butane, 2,2-bis(4,4-di-t-butylperoxycyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy) diisopropylbenzene, dicumyl peroxide, 2,5-dimethyl-2,5-bis(t-butylperoxy)hexane, t-butyl cumyl peroxide, di-t-butyl peroxide, 2,5-dimethyl-2,5-bis(t-butylperoxy)hexane, isobutyryl peroxide, 3,5,5-trimethylhexanoyl peroxide, octanoyl peroxide, lauroyl peroxide, stearoyl peroxide, succinoyl peroxide, m-toluoyl benzoyl peroxide, benzoyl peroxide, di-n-propyl peroxydicarbonate, diisopropyl peroxydicarbonate, bis(4-t-butylcyclohexyl) peroxydicarbonate, di-2-ethoxyethyl peroxydicarbonate, di-2-ethoxyhexyl peroxydicarbonate, di-3-methoxybutyl peroxydicarbonate, di-s-butyl peroxydicarbonate, di(3-methyl-3-methoxybutyl) peroxydicarbonate, α,α'-bis(neodecanoylperoxy) diisopropylbenzene, cumyl peroxyneodecanoate, 1,1,3,3-tetramethylbutyl peroxyneodecanoate, 1-cyclohexyl-1-methyl ethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexanoate, 1-cyclohexyl-1-methylethylperoxy-2-ethylhexanoate, t-hexylperoxy-2-ethylhexanoate, t-butylperoxy-2-ethylhexanoate, t-hexylperoxy isopropyl monocarbonate, t-butylperoxy isobutyrate, t-butyl peroxymalate, t-butylperoxy-3,5,5-trimethyl hexanoate, t-butyl peroxylaurate, t-butylperoxy isopropyl monocarbonate, t-butylperoxy-2-ethylhexyl monocarbonate, t-butyl peroxyacetate, t-butyl peroxy m-toluyl benzoate, t-butyl peroxy benzoate, bis(t-butylperoxy) isophthalate, 2,5-dimethyl-2,5-bis(m-toluoylperoxy)hexane, t-hexyl peroxybenzoate, 2,5-dimethyl-2,5-bis(benzoylperoxy)hexane, t-butyl peroxy allyl monocarbonate, t-butyl trimethylsilyl peroxide, 3,3',4,4'-tetra(t-butylperoxy carbonyl)benzophenone and 2,3-dimethyl-2,3-diphenylbutane.

Examples of azo-type initiators include 2-phenylazo-4-methoxy-2,4-dimethylvaleronitrile, 1-[(1-cyano-1-methylethyl)azo]formamide, 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(2,4-dimethyl-4-methoxyvaleronitrile), 2,2'-azobis(2-methylpropionamidine) dihydrochloride, 2,2'-azobis(2-methyl-N-phenylpropionamidine) dihydrochloride, 2,2'-azobis[N-(4-chlorophenyl)-2-methylpropionamidine] dihydrochloride, 2,2'-azobis[N-(4-hydrophenyl)-2-methylpropionamidine] dihydrochloride, 2,2'-azobis[2-methyl-N-(phenylmethyl)propionamidine] dihydrochloride, 2,2'-azobis[2-methyl-N-(2-propenyl)propionamidine] dihydrochloride, 2,2'-azobis[N-(2-hydroxyethyl)-2-methylpropionamidine] dihydrochloride, 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane] dihydrochloride, 2,2'-azobis{2-[1-(2-hydroxyethyl)-2-imidazolin-2-yl]propane} dihydrochloride, 2,2'-azobis[2-(2-imidazolin-2-yl)propane], 2,2'-azobis{2-methyl-N-[1,1-bis(hydroxymethyl)-2-hydroxyethyl] propionamide}, 2,2'-azobis{2-methyl-N-[1,1-bis(hydroxymethyl)ethyl] propionamide}, 2,2'-azobis[2-methyl-N-(2-hydroxyethyl) propionamide], 2,2'-azobis(2-methylpropionamide), 2,2'-azobis(2,4,4-trimethylpentane), 2,2'-azobis(2-methylpropane), dimethyl-2,2'-azobis(2-methylpropionate), 4,4'-azobis(4-cyanopentanoic acid) and 2,2'-azobis[2-(hydroxymethyl)propionitrile.

A radical polymerization promoter may be used together with the above thermal radical initiator. Radical polymerization promoters that may be used are ones which promote decomposition of the thermal radical initiator (the formation of initiating radicals); any commonly employed radical polymerization promoter may be used without particular limitation. Illustrative examples include organic salts, inorganic salts, oxides and metal complexes of metals such as cobalt, copper, tin, zinc, manganese, iron, zirconium, chromium, vanadium, calcium, potassium, cerium and samarium; primary, secondary and tertiary amine compounds; quaternary ammonium salts; thiourea compounds; and ketone compounds. Specific examples include cobalt octanoate, cobalt naphthenate, zinc octanoate, zinc naphthenate, zirconium octanoate, zirconium naphthenate, copper octanoate, copper naphthenate, manganese octanoate, manganese naphthenate, dimethylaniline, triethanolamine, triethyl benzyl ammonium chloride, di(2-hydroxyethyl) p-toluidine, ethylene thiourea, acetylacetone and methyl acetoacetate.

Suitable photoradical initiators include alkylphenone compounds, benzophenone compounds, benzoin compounds, thioxanthone compounds, halomethylated triazine compounds, halomethylated oxadiazole compounds, biimidazole compounds, oxime ester compounds, titanocene compounds, benzoic acid ester compounds and acridine compounds. Specific examples include those listed below.

Alkylphenone compounds such as 2,2-diethoxyacetophenone, 2,2-dimethoxy-2-phenyl acetophenone, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2-methyl-1-(4-methylthiophenyl)-2-morpholinopropan-1-one, 2-benzyl-2-dimethylamino-1-(4-morpholinophenyl)butan-1-one and 2-(dimethylamino)-2-[(4-methylphenyl)methyl]-1-[4-(4-morpholinyl)phenyl]-1-butanone; benzophenone compounds such as benzophenone, 4,4'-bis(dimethylamino)benzophenone and 2-carboxybenzophenone; benzoin compounds such as benzoin methyl ether, benzoin ethyl ether, benzoin isopropyl ether and benzoin isobutyl ether; thioxanthone compounds such as thioxanthone, 2-ethylthioxanthone, 2-isopropylthioxanthone, 2-chlorothioxanthone, 2,4-dimethylthioxanthone and 2,4-diethylthioxanthone; halomethylated triazine compounds such as 2-(4-methoxyphenyl)-4,6-bis(trichloromethyl)-s-triazine, 2-(4-methoxynaphthyl)-4,6-bis(trichloromethyl)-s-triazine, 2-(4-ethoxynaphthyl)-4,6-bis(trichloromethyl)-s-triazine and 2-(4-ethoxycarbonylnaphthyl)-4,6-bis(trichloromethyl)-s-triazine; halomethylated oxadiazole compounds such as 2-trichloromethyl-5-(2'-benzofuryl)-1,3,4-oxadiazole, 2-trichloromethyl-5-[β-(2'-benzofuryl)vinyl]-1,3,4-oxadiazole, 4-oxadiazole and 2-trichloromethyl-5-furyl-1,3,4-oxadiazole; biimidazole compounds such as 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole and 2,2'-bis(2,4,6-trichlorophenyl)-4,4',5,5'-tetraphenyl-1,2'-biimidazole; oxime ester compounds such as 1,2-octanedione, 1-[4-(phenylthio)-2-(O-benzoyloxime)], ethanone and 1-[9-ethyl-6-(2-methylbenzoyl)-9H-carbazol-3-yl]-1-(O-acetyloxime); titanocene compounds such as bis(η5-2,4-cyclopentadien-1-yl)-bis(2,6-difluoro-3-(1H-pyrrol-1-yl)phenyl)titanium; benzoic acid ester compounds such as p-dimethylaminobenzoic acid and p-diethylaminobenzoic acid; and acridine compounds such as 9-phenylacridine.

By using a photosensitizer and a radical polymerization promoter together with the above photoradical initiator, the sensitivity and curability of the composition can be enhanced. Commonly used photosensitizers and radical polymerization promoters may be employed as these additives without particular limitation. Dye-type compounds, dialkylaminobenzene compounds, mercaptan-type hydrogen donors and the like are suitable. Examples include dye-type compounds such as xanthene dyes, coumarin dyes, 3-ketocoumarin compounds and pyrromethene dyes; dialkylaminobenzene compounds such as ethyl 4-dimethylaminobenzoate and 2-ethylhexyl 4-dimethylaminobenzoate; and mercaptan-type hydrogen donors such as 2-mercaptobenzothiazole, 2-mercaptobenzooxazole and 2-mercaptobenzoimidazole.

The total amount of the radical initiator added may be suitably set according to the intended purpose and application, and is not particularly limited. However, from the standpoint of the balance between the curability, adverse effects of the decomposition products and economic considerations, the total amount per 100 parts by weight of the organosilicon compound of the invention is preferably from 0.01 to 30 parts by weight, more preferably from 0.05 to 20 parts by weight, and even more preferably from 0.1 to 15 parts by weight.

The total amount of the radical polymerization promoter and the photosensitizer added may be suitably set according to the intended purpose and application and is not particularly limited. However, from the standpoint of the balance between the curability and economic considerations, the total amount per 100% by weight of the organosilicon compound of the invention is preferably from 0.001 to 20% by weight, more preferably from 0.005 to 10% by weight, and even more preferably from 0.01 to 10% by weight.

Other ingredients may be added to the curable composition of the invention within ranges that do not detract from the objects of the invention. Such other ingredients may include, without particular limitation, drying agents having a peroxide decomposition promoting action, other curing promoters, solvents, reactive diluents, stabilizers, binder resins, colorants, dispersants, fillers, adhesion promoters, parting agents, leveling agents and antistatic agents.

Illustrative, non-limiting examples of solvents include aromatic hydrocarbons such as benzene, toluene and xylene; aliphatic hydrocarbons such as pentane, hexane, heptane and decane; ethers such as diethyl ether and tetrahydrofuran; esters such as ethyl acetate and butyl acetate; and ketones such as acetone, methyl ethyl ketone and methyl isobutyl ketone. These may be used singly or two or more may be used in combination.

When these solvents are added, the amount of addition per 100 parts by weight of the base resin component is preferably from 1 to 50 parts by weight, and more preferably from 5 to 20 parts by weight.

A coated solid substrate can be obtained by applying the above-described coating composition of the invention onto the surface of a solid substrate and curing the composition to form a coating layer.

Alternatively, a bonded laminate can be obtained by applying the adhesive composition of the invention onto the surface of a solid substrate, placing another solid substrate on top thereof, and then curing the composition of the invention to form a bonded layer.

The methods used to apply the respective compositions are not particularly limited, and may be suitably selected from among known methods, such as spray coating, spin coating, dip coating, roller coating, brush coating, bar coating and flow coating.

The solid substrate is not particularly limited. Specific examples include the following organic resin substrates: epoxy resins, phenolic resins, polyimide resins, polycarbonate resins such as polycarbonates and polycarbonate blends, acrylic resins such as poly(methyl methacrylate), polyester resins such as poly(ethylene terephthalate), poly(butylene terephthalate) and unsaturated polyester resins, polyamide resins, acrylonitrile-styrene copolymer resins, styrene-acrylonitrile-butadiene copolymer resins, polyvinyl chloride resins, polystyrene resins, blended resins of polystyrene and polyphenylene ether, cellulose acetate butyrate resins and polyethylene resins; metal substrates such as iron, copper and steel sheets or plates; paint-coated surfaces; glass; ceramic; concrete; slate panels; textiles; wood; stone; tile; inorganic fillers such as (hollow) silica, titania, zirconia and alumina; and glass products such as glass fiber products, including not only glass fibers but also glass cloth, glass tape, glass mat and glass paper, and also plate glass. There are no particular limitations on the shape of the substrate.

[Primer Composition]

Because a composition containing the organosilicon compound of the invention is able to increase the adherence to substrates, it can be suitably used as a primer composition when coating various substrates.

Various types of additives may be optionally added to the primer composition of the invention.

Specific examples of the additives include diluting solvents, curing catalysts, physical property-adjusting agents which adjust the tensile properties of the cured film that forms, storage stability enhancers, radical chain inhibitors, metal inactivators, antiozonants, lubricants and pigments.

Diluting solvents include, without particular limitation, water; alcohols such as methanol, ethanol and isopropanol; aromatic hydrocarbons such as benzene, toluene and xylene; aliphatic hydrocarbons such as pentane, hexane, heptane and decane; ethers such as diethyl ether, tetrahydrofuran and 1,4-dioxane; esters such as ethyl acetate and butyl acetate; and ketones such as acetone, methyl ethyl ketone and methyl isobutyl ketone. These may be used singly or two or more may be used in combination. When a diluting solvent is used, the concentration of the organosilicon compound is preferably from 0.1 to 10% by weight, and more preferably from 0.5 to 5% by weight.

The method of applying the primer composition is not particularly limited; methods similar to those as for the curable composition may be used. A laminate having a cured film can be obtained by applying the primer composition onto a solid substrate to form a primer film, and then additionally applying a coating agent, paint or the like onto the primer film.

The solid substrate also is not particularly limited. Use can be made of solid substrates similar to those described above for the curable composition.

The coating agent that is applied onto the primer film may be suitably selected from among known coating agents, examples of which include acrylic coating agents, epoxy coating agents, urethane coating agents, silicone coating agents and urethane acrylate coating agents.

EXAMPLES

The invention is illustrated more fully below by way of Examples and Comparative Examples, although the invention is not limited by these Examples.

In the following Examples, the kinematic viscosity, specific gravity and refractive index are values measured at 25° C., and all parts are by weight. The kinematic viscosity was measured based on JIS Z 8803. The specific gravity was measured based on JIS Z 8804. The refractive index was measured based on JIS K 0062. Nuclear magnetic resonance spectral ($^1$H-NMR) measurements were carried out in heavy chloroform using the Bruker Avance III/Ultrashield 400 spectrometer. Gas chromatography (GC) was carried under the following measurement conditions.

GC apparatus: 6890N (Agilent Technologies)

Detector: hydrogen flame ionization detector (FID)

Column: HP-5 J-413 (length, 30 m; inside diameter, 0.32 mm; film thickness, 0.25 μm)

Column temperature: 50° C.→10° C./min→300° C. (10 minute retention) total measurement time, 35.0 minutes Injection port temperature: 250° C.

Detector temperature: 300° C.

Carrier gas: helium

Carrier gas flow rate: 1.0 mL/min

[1] Synthesis of Organosilicon Compound

[Example 1-1] Synthesis of Organosilicon Compound 1

A one-liter separable flask equipped with a stirrer, a reflux condenser, a dropping funnel and a thermometer was charged with 100.0 g (0.55 mol) of potassium 2-(allyloxymethyl)acrylate, 100 g of toluene, 0.3 g of 2,6-di-t-butyl-p-cresol and 3.1 g of tetrabutylammonium bromide, following which 109.3 g (0.55 mol) of 3-chloropropyltrimethoxysilane was added dropwise over one hour at an internal temperature of between 95° C. and 105° C. The flask contents were then stirred for 3 hours at 100° C. and analyzed by gas chromatography, as a result of which the disappearance of 3-chloropropyltrimethoxysilane was confirmed. The resulting solution was purified by distillation at 5 mmHg and 160° C., giving 120 g of a clear colorless liquid (Organosilicon Compound 1) having a kinematic viscosity of 4.57 mm$^2$/s, a specific gravity of 1.060 and a refractive index of 1.4442.

The Organosilicon Compound 1 thus obtained was confirmed by $^1$H-NMR measurement to have the structure shown in formula (6) above.

$^1$H-NMR ($CDCl_3$, 400 MHz) δ: 0.56-0.67 (m, 2H), 1.66-1.80 (m, 2H), 3.53 (s, 9H), 3.92-4.00 (d, 2H), 4.02-4.08 (m, 2H), 4.16 (s, 2H), 5.07-5.28 (d, 2H), 5.77-5.91 (d, 2H), 6.28 (s, 1H).

[Example 1-2] Synthesis of Organosilicon Compound 2

A one-liter separable flask equipped with a stirrer, a reflux condenser, a dropping funnel and a thermometer was charged with 100.0 g (0.55 mol) of potassium 2-(allyloxymethyl)acrylate, 100 g of toluene, 0.3 g of 2,6-di-t-butyl-p-cresol and 3.1 g of tetrabutylammonium bromide, following which 100.5 g (0.55 mol) of 3-chloropropylmethyldimethoxysilane was added dropwise over one hour at an internal temperature of between 95° C. and 105° C. The flask contents were then stirred for 3 hours at 100° C. and analyzed by gas chromatography, as a result of which the disappearance of 3-chloropropylmethyldimethoxysilane was confirmed. The resulting solution was purified by distillation at 5 mmHg and 158° C., giving 110 g of a clear colorless liquid (Organosilicon Compound 2) having a kinematic viscosity of 4.66 mm$^2$/s, a specific gravity of 1.024 and a refractive index of 1.4483.

The Organosilicon Compound 2 thus obtained was confirmed by $^1$H-NMR measurement to have the structure shown in formula (7) above.

$^1$H-NMR ($CDCl_3$, 400 MHz) δ: 0.09 (s, 3H), 0.56-0.67 (m, 2H), 1.66-1.80 (m, 2H), 3.53 (s, 6H), 3.92-4.00 (d, 2H), 4.02-4.08 (m, 2H), 4.16 (s, 2H), 5.07-5.28 (d, 2H), 5.77-5.91 (d, 2H), 6.28 (s, 1H).

[2] Production of Primer Compositions and Cured Films (Cured Articles)

Examples 2-1 and 2-2, Comparative Examples 2-1 and 2-2

A primer composition was prepared by mixing the ingredients in the proportions (parts by weight) shown in Table 1. The resulting primer composition was flow-coated onto a glass substrate in 25° C., 50% RH air and then dried at 80° C. for 5 minutes, giving a primer film.

A topcoating composition was applied onto the primer film in 25° C., 50% RH air using a No. 20 bar coater. The topcoating composition used was obtained by mixing 3% by weight of Omnirad 184 (from IGM Resins B.V.) into Luxydir 17-813 (a urethane acrylate resin from DIC Corporation). After 10 minutes of drying at 80° C., UV irradiation (74 mW/cm$^2$) was carried out, giving a laminate having a cured film.

The pencil hardness and adherence of the resulting cured film were measured and evaluated by the following methods. The results are presented in Table 1.

[Pencil Hardness (Surface Hardness)]

Measured under a load of 750 g in accordance with JIS K5600-5-4.

[Adherence]

Crosscut Peel Test: Carried out in accordance with JIS K 5400.

Adherence after Boiling Test: A test piece was immersed for 2 hours in 100° C. hot water, following which the crosscut peel test was carried out.

The evaluation results shown in Table 1 indicate the number of crosscut squares out of 100 that remained after peeling.

TABLE 1

| Ingredients (pbw) | Example 2-1 | Example 2-2 | Comparative Example 2-1 | Comparative Example 2-2 |
|---|---|---|---|---|
| Primer composition | | | | |
| Ion-exchanged water | 50 | 50 | 50 | 50 |
| Methanol | 50 | 50 | 50 | 50 |
| Organosilicon Compound 1 | 1 | | | |
| Organosilicon Compound 2 | | 1 | | |
| Organosilicon Compound 3 | | | 1 | |
| AOMA | | | | 1 |
| Evaluation Results | | | | |
| Pencil hardness | 6H | 6H | 5H | 6H |
| Adherence | 100 | 100 | 100 | 0 |
| Adherence after boiling test | 100 | 100 | 0 | 0 |

Organosilicon Compound 3: 3-(methacryloyloxy)propyltrimethoxysilane (KBM-503, from Shin-Etsu Chemical Co., Ltd.)

AOMA: methyl 2-(allyloxymethyl)acrylate (from Nippon Shokubai Co., Ltd.)

The results in the above Examples and Comparative Examples demonstrate that the modified surfaces formed using the organosilicon compounds of Examples 1-1 and 1-2 have an excellent adherence to acrylate resins.

[3] Production of Curable Compositions and Cured Films (Cured Articles)

Examples 3-1 and 3-2, Comparative Examples 3-1 and 3-2

A UV-curable urethane resin composition was prepared by mixing the ingredients in the proportions (parts by weight) shown in Table 2. The resulting UV-curable urethane resin composition was applied onto plate glass using a No. 12 bar coater in 25° C., 50% RH air and then cured and dried for one week in 25° C., 50% RH air. In addition, UV irradiation (74 $mW/cm^2$) was carried out, giving a cured film.

The pencil hardness and adherence of the resulting cured film were measured and evaluated by the following methods. The results are presented in Table 2.

[Pencil Hardness (Surface Hardness)]

Measured under a load of 750 g in accordance with JIS K5600-5-4.

[Adherence]

Crosscut Peel Test: Carried out in accordance with JIS K 5400.

The evaluation results shown in Table 2 indicate the number of crosscut squares out of 100 that remained after peeling.

TABLE 2

| Ingredients (pbw) | Example 3-1 | Example 3-2 | Comparative Example 3-1 | Comparative Example 3-2 |
|---|---|---|---|---|
| UV-curable urethane resin | 100 | 100 | 100 | 100 |
| Ethyl acetate | 15 | 15 | 15 | 15 |
| Curing catalyst | 0.6 | 0.6 | 0.6 | 0.6 |
| Photoradical initiator | 3 | 3 | 3 | 3 |
| Organosilicon Compound 1 | 30 | | | |
| Organosilicon Compound 2 | | 30 | | |
| Organosilicon Compound 3 | | | 30 | |
| AOMA | | | | 30 |
| Evaluation Results | | | | |
| Pencil hardness | 3H | 3H | 2H | 3H |
| Adherence | 100 | 100 | 0 | 0 |

UV-curable urethane resin: Luxydir 17-813 (DIC Corporation)

Curing catalyst: DX-9740 (Shin-Etsu Chemical Co., Ltd.)

Photoradical initiator: Omnirad 184 (IGM Resins B.V.)

Organosilicon Compound 3: (3-methacryloyloxy)propyltrimethoxysilane (KBM-503, from Shin-Etsu Chemical Co., Ltd.)

AOMA: methyl 2-(allyloxymethyl)acrylate (Nippon Shokubai Co., Ltd.)

The results in the above Examples and Comparative Examples demonstrate the excellent adherence to a glass substrate of urethane resin compositions to which the organosilicon compounds of Examples 1-1 and 1-2 have been added.

The invention claimed is:

1. An organosilicon compound of formula (1) below

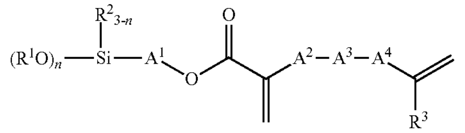

(1)

wherein each $R^1$ is independently an alkyl group of 1 to 10 carbon atoms, an alkenyl group of 2 to 10 carbon atoms, an aryl group of 6 to 10 carbon atoms or an acyl group of 1 to 20 carbon atoms;

each $R^2$ is independently an alkyl group of 1 to 10 carbon atoms or an aryl group of 6 to 10 carbon atoms;

$R^3$ is a hydrogen atom or a methyl group;

$A^1$ is a single bond or a substituted or unsubstituted divalent hydrocarbon group of 1 to 20 carbon atoms;

$A^2$, $A^3$ and $A^4$ are each independently a substituted or unsubstituted methylene group or oxygen atom, with the proviso that one or more of $A^2$, $A^3$ and $A^4$ is an oxygen atom and no oxygen atoms are mutually adjoining; and n is an integer from 1 to 3.

2. The organosilicon compound of claim 1, wherein $A^1$ is an alkylene group of 1 to 10 carbon atoms.

3. The organosilicon compound of claim 1, wherein $A^2$ and $A^4$ are methylene groups, and $A^3$ is an oxygen atom.

4. A method for preparing the organosilicon compound of claim 1, comprising the step of reacting a halogen group-containing organosilicon compound of formula (3) below with a metal salt compound of formula (4) below, (3)

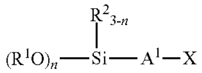

(4)

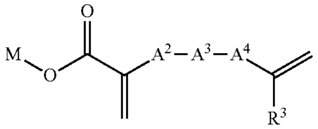

wherein each $R^1$ is independently an alkyl group of 1 to 10 carbon atoms, an alkenyl group of 2 to 10 carbon atoms, an aryl group of 6 to 10 carbon atoms or an acyl group of 1 to 20 carbon atoms; each $R^2$ is independently an alkyl group of 1 to 10 carbon atoms or an aryl group of 6 to 10 carbon atoms; $R^3$ is a hydrogen atom or a methyl group; $A^1$ is a single bond or a substituted or unsubstituted divalent hydrocarbon group of 1 to 20 carbon atoms; $A^2$, $A^3$ and $A^4$ are each independently a substituted or unsubstituted methylene group or oxygen atom, with the proviso that one or more of $A^2$, $A^3$ and $A^4$ is an oxygen atom and no oxygen atoms are mutually adjoining; and n is an integer from 1 to 3; X is a chlorine, bromine or iodine atom; and M is an alkali metal.

5. A curable composition comprising the organosilicon compound of claim 1.

6. A coating agent comprising the curable composition of claim 5.

7. An article having a coating layer obtained by curing the coating agent of claim 6.

8. An adhesive comprising the curable composition of claim 5.

9. An article having a bonding layer obtained by curing the adhesive of claim 8.

10. A cured product obtained by curing the curable composition of claim 5.

* * * * *